(12) United States Patent
Li

(10) Patent No.: US 11,745,789 B2
(45) Date of Patent: Sep. 5, 2023

(54) HANDWHEEL ACTUATOR FOR STEER BY WIRE SYSTEM

(71) Applicant: Steering Solutions IP Holding Corporation, Saginaw, MI (US)

(72) Inventor: Haiquan Li, Rochester Hills, MI (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 411 days.

(21) Appl. No.: 17/061,757

(22) Filed: Oct. 2, 2020

(65) Prior Publication Data

US 2021/0129899 A1    May 6, 2021

Related U.S. Application Data

(60) Provisional application No. 62/928,921, filed on Oct. 31, 2019.

(51) Int. Cl.
| | |
|---|---|
| *B62D 5/00* | (2006.01) |
| *B62D 1/04* | (2006.01) |
| *F16H 1/28* | (2006.01) |
| *B62D 5/04* | (2006.01) |
| *H02K 7/116* | (2006.01) |

(52) U.S. Cl.
CPC ............... *B62D 5/006* (2013.01); *B62D 1/04* (2013.01); *B62D 5/0406* (2013.01); *F16H 1/28* (2013.01); *H02K 7/116* (2013.01)

(58) Field of Classification Search
CPC .............................. B62D 5/006; B62D 5/0406
See application file for complete search history.

(56) References Cited

U.S. PATENT DOCUMENTS

| | | | | |
|---|---|---|---|---|
| 6,481,526 B1* | 11/2002 | Millsap | ................... | B62D 5/006 180/402 |
| 6,991,573 B2* | 1/2006 | Yun | ...................... | B62D 5/0427 180/408 |
| 7,118,506 B2* | 10/2006 | Zheng | ................... | B62D 5/008 180/6.38 |
| 7,322,898 B2* | 1/2008 | Augustine | .............. | B62D 5/008 180/428 |

(Continued)

FOREIGN PATENT DOCUMENTS

| | | |
|---|---|---|
| CN | 101445127 A | 6/2009 |
| CN | 101767606 A * | 7/2010 |

(Continued)

OTHER PUBLICATIONS

Translation Referene N: CN-101767606 from Ip.com on Jan. 6, 2023.*

(Continued)

*Primary Examiner* — Minnah L Seoh
*Assistant Examiner* — Ryan Edward Hardy
(74) *Attorney, Agent, or Firm* — Dickinson Wright PLLC

(57) ABSTRACT

A handwheel actuator assembly includes a handwheel shaft configured for connection to a handwheel, the handwheel shaft extending longitudinally about an axis. The handwheel actuator assembly also includes a motor operatively coupled to the handwheel shaft. The handwheel actuator assembly further includes a planetary gear assembly disposed within the motor. The handwheel actuator assembly yet further includes an electronic control unit (ECU) in operative communication with the motor.

12 Claims, 3 Drawing Sheets

(56) References Cited

U.S. PATENT DOCUMENTS

| | | | |
|---|---|---|---|
| 10,384,709 B2* | 8/2019 | Joughin | B62D 5/04 |
| 2009/0101431 A1* | 4/2009 | Yamanaka | B62D 5/008 |
| | | | 475/349 |
| 2014/0353069 A1* | 12/2014 | Chae | B62D 3/12 |
| | | | 180/444 |
| 2017/0129533 A1* | 5/2017 | Naspolini | H02K 11/22 |
| 2019/0092373 A1* | 3/2019 | Nofzinger | B62D 5/006 |

FOREIGN PATENT DOCUMENTS

| | | |
|---|---|---|
| CN | 101767606 A | 7/2010 |
| CN | 105936292 A | 9/2016 |
| CN | 206049777 U | 3/2017 |
| CN | 107933684 A | 4/2018 |
| CN | 110337399 A | 10/2019 |
| DE | 102006059972 A1 | 6/2008 |
| EP | 1205372 A2 | 5/2002 |

OTHER PUBLICATIONS

English translation of First Office Action regarding corresponding CN App. No. 2020112033783; dated Aug. 10, 2022.

* cited by examiner

HANDWHEEL ACTUATOR FOR STEER BY WIRE SYSTEM

CROSS-REFERENCE TO RELATED APPLICATION

This application claims the benefit of priority to U.S. Provisional Patent Application Ser. No. 62/928,921, filed Oct. 31, 2019, the disclosure of which is incorporated by reference herein in its entirety.

BACKGROUND

Vehicles are provided with a steering wheel that allows a human operator to directionally control the vehicle. As the automotive industry advances technologically toward autonomous driving assist systems, the steering wheel may not need to be manually manipulated by a driver at all times of vehicle operation. As such advances are made, consumers will prefer a reduced space to be taken up by the steering system to increase the available space for comfort or other functionality in the cabin of the vehicle.

SUMMARY OF THE DISCLOSURE

According to one aspect of the disclosure, a handwheel actuator assembly includes a handwheel shaft configured for connection to a handwheel, the handwheel shaft extending longitudinally about an axis. The handwheel actuator assembly also includes a motor operatively coupled to the handwheel shaft. The handwheel actuator assembly further includes a planetary gear assembly disposed within the motor. The handwheel actuator assembly yet further includes an electronic control unit (ECU) in operative communication with the motor.

According to another aspect of the disclosure, a handwheel actuator assembly includes a motor located within a housing. The handwheel actuator assembly also includes a planetary gear assembly located axially aligned with the motor and radially inwardly of the motor. The handwheel actuator further includes a handwheel shaft operatively coupled to the planetary gear assembly.

These and other advantages and features will become more apparent from the following description taken in conjunction with the drawings.

BRIEF DESCRIPTION OF THE DRAWINGS

The subject matter that is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

Referring now to the Figures, where the invention will be described with reference to specific embodiments, without limiting same, various embodiments of the invention disclosed herein are shown.

Figure 1:
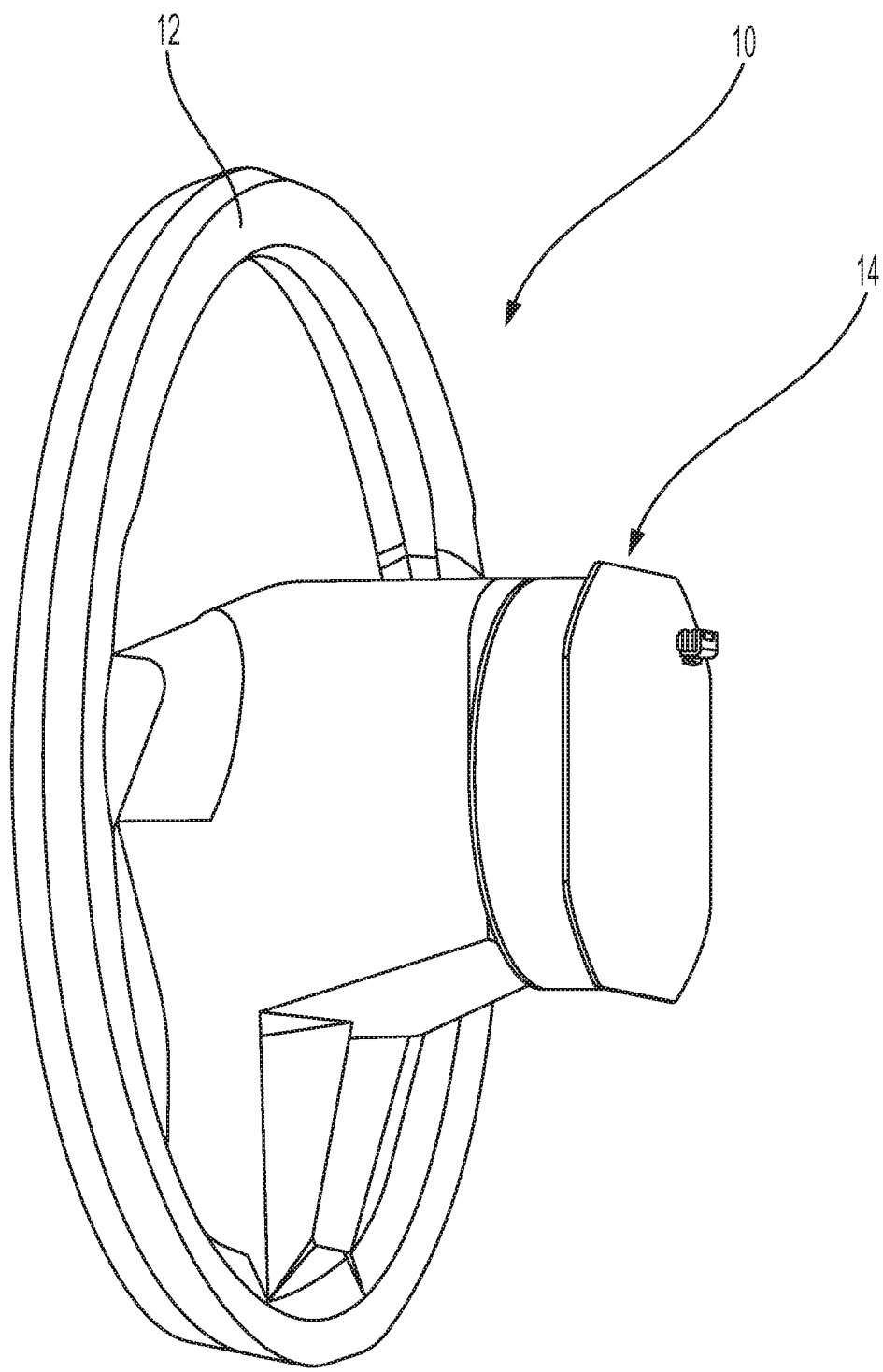
FIG. 1 is a perspective view of a handwheel actuator assembly.

Referring now to FIG. 1, a handwheel actuator assembly is illustrated and generally referenced with numeral 10. The handwheel actuator assembly 10 includes a handwheel 12 that is accessible to an operator of the vehicle. The handwheel 12 may be rotatably manipulated to directionally control the vehicle. The handwheel actuator assembly 10 also includes a motor 14 that is operatively coupled to the handwheel 12 via a handwheel shaft (FIGS. 2 and 3) and is part of an electric power steering (EPS) system of the vehicle. The handwheel shaft may be a splined stub or part of the other components described herein.

The motor 14 is in electrical—wired or wireless—communication with other components of the EPS system to carry out steering maneuvers and to provide road feedback to an operator through the handwheel 12.

Figure 2:
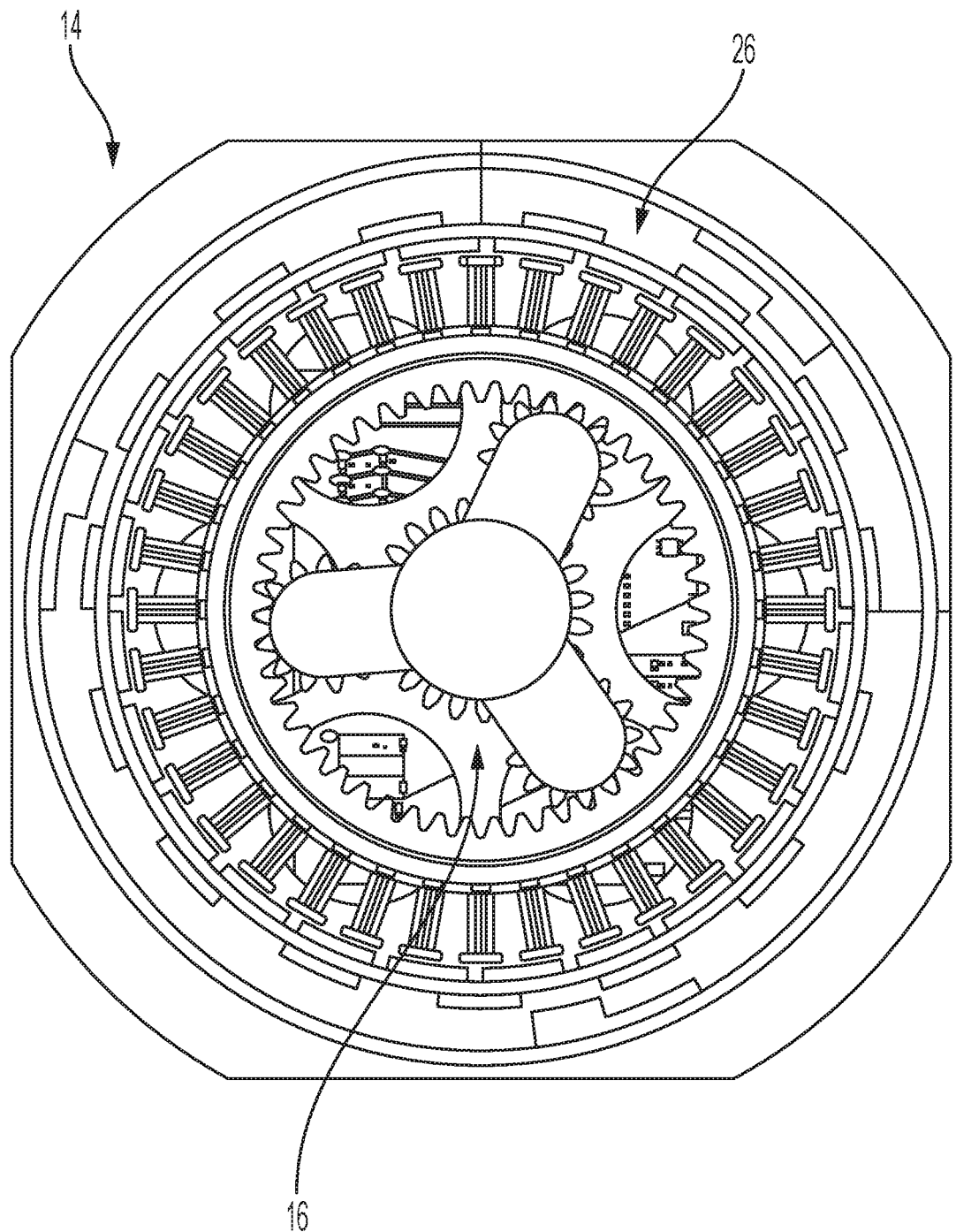
FIG. 2 is a sectional view of the handwheel actuator assembly illustrating a planetary gear assembly.
Figure 3:
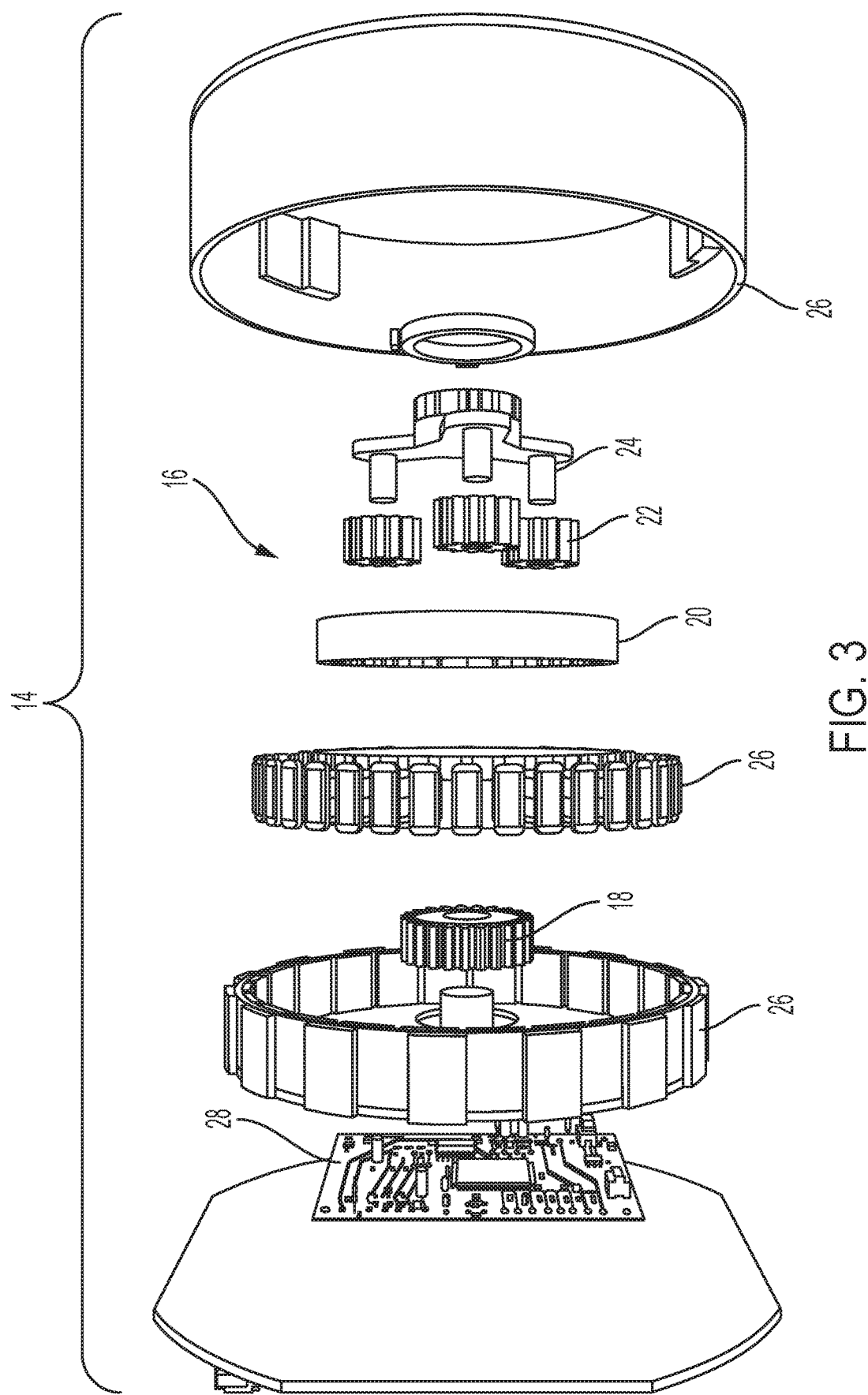
FIG. 3 is a disassembled view of the handwheel actuator assembly.

Referring now to FIGS. 2 and 3, the motor 14 is illustrated in greater detail. As will be appreciated from the disclosure, the compact nature of the handwheel actuator assembly 10 is achieved by use of a planetary gear assembly 16 that is located radially within the motor 14. As shown, the planetary gear assembly 16 includes a sun gear 18, a ring gear 20, a plurality of planet gears 22, and a carrier 24. In some embodiments, the carrier 24 has the handwheel shaft integrally formed to it or operatively coupled to it for connection to the handwheel 12. Although three planet gears 22 are shown, it is to be appreciated that a different number of planet gears may be employed in other embodiments.

The ring gear 20 is rotationally fixed to a rotor and stator assembly 26 that is in electrical communication with an ECU 28 and read sensor. Rotationally fixing the ring gear 20 results in the planet gears 22 providing output power to drive the handwheel 12, which it is operatively coupled to via at least in part the handwheel shaft, upon rotation of the sun gear 18. The ECU 28 controls the steering system, provides feedback to the operator, and facilitates the ability of the operator to turn the handwheel 12 via the handwheel shaft to control the road wheels.

The rotor and stator assembly 26 is arranged such that the rotor is radially inward of the stator, such that the electrical relationship of the stator and rotor generates rotation of the rotor. The rotor and stator assembly 26 is located radially outward of the planetary gear assembly 16, with the rotor fixed to the ring gear 20 in a fixed relationship. Rotation of the ring gear 20 via the rotor drives the planet gears 22, as described above. The rotor and stator assembly 26, the ECU 28, as well as all elements of the planetary gear arrangement 16 are encased within a housing. The stator is operatively coupled to the housing in some embodiments, either directly or indirectly. The radial orientation and use of the planetary gear arrangement with a radially exterior motor provides the benefits of overall compactness described herein.

The embodiments disclosed herein significantly reduce the size of the overall handwheel actuator assembly by using an external motor that includes the planetary gear assembly disposed therein. This provides benefits to consumers in the context of comfort and convenience, and to vehicle manufacturers since they have more flexibility to design the driver area of the vehicle.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to

Having thus described the invention, it is claimed:

1. A handwheel actuator assembly comprising:
   a handwheel shaft configured for connection to a handwheel, the handwheel shaft extending longitudinally about an axis;
   a motor operatively coupled to the handwheel shaft;
   a planetary gear assembly disposed within the motor, wherein the motor comprises a stator and a rotor, wherein the rotor is operatively coupled to the planetary gear assembly at a radially outward location of the planetary gear assembly, wherein the stator is radially outward of the rotor;
   an electronic control unit (ECU) in operative communication with the motor; and
   a ring gear fixed to a radially inner surface of the rotor.

2. The handwheel actuator assembly of claim 1, further comprising a housing encasing the stator and the rotor.

3. The handwheel actuator assembly of claim 2, wherein the entire planetary gear assembly is located radially inwardly of the rotor.

4. The handwheel actuator assembly of claim 3, wherein the entire planetary gear assembly is located within the housing.

5. The handwheel actuator assembly of claim 1, wherein the planetary gear assembly comprises the ring gear, a sun gear, and a plurality of planet gears.

6. The handwheel actuator assembly of claim 2, wherein the stator is operatively coupled to the housing.

7. The handwheel actuator assembly of claim 2, wherein the ECU is located within the housing.

8. A handwheel actuator assembly comprising:
   a motor located within a housing;
   a planetary gear assembly located axially aligned with the motor and radially inwardly of the motor, wherein the motor comprises a stator and a rotor, wherein the rotor is operatively coupled to the planetary gear assembly at a radially outward location of the planetary gear assembly, wherein the planetary gear assembly comprises a ring gear, a sun gear, and a plurality of planet gears, wherein the ring gear is fixed to a radially inner surface of the rotor; and
   a handwheel shaft operatively coupled to the planetary gear assembly.

9. The handwheel actuator assembly of claim 8, wherein the motor is in operative communication with an electronic control unit (ECU).

10. The handwheel actuator assembly of claim 8, wherein the stator is radially outward of the rotor.

11. The handwheel actuator assembly of claim 8, wherein the stator is operatively coupled to the housing.

12. The handwheel actuator assembly of claim 9, wherein the ECU is located within the housing.

* * * * *